(12) United States Patent
Czerny et al.

(10) Patent No.: US 11,367,177 B2
(45) Date of Patent: Jun. 21, 2022

(54) CHECKING DEVICE FOR A LABEL, WITH A DETECTION AND PROCESSING UNIT FOR THE DETECTION OF THE LABEL

(71) Applicant: Wipotec Wiege-und Positioniersysteme GmbH, Kaiserslautern (DE)

(72) Inventors: Hans Michael Czerny, Zurich (CH); Karl Georg Burri, Oberrieden (CH)

(73) Assignee: Wipotec Wiege-und Positioniersysteme GmbH, Kaiserslautern (DE)

( * ) Notice: Subject to any disclaimer, the term of this patent is extended or adjusted under 35 U.S.C. 154(b) by 0 days.

(21) Appl. No.: 14/408,514

(22) PCT Filed: Jun. 18, 2013

(86) PCT No.: PCT/DE2013/100219
§ 371 (c)(1),
(2) Date: Dec. 16, 2014

(87) PCT Pub. No.: WO2013/189487
PCT Pub. Date: Dec. 27, 2013

(65) Prior Publication Data
US 2015/0104079 A1  Apr. 16, 2015

(30) Foreign Application Priority Data
Jun. 18, 2012 (DE) .................... 20 2012 102 237.0

(51) Int. Cl.
*G06T 7/00* (2017.01)
*G06K 7/10* (2006.01)
*G06K 15/02* (2006.01)

(52) U.S. Cl.
CPC .......... *G06T 7/001* (2013.01); *G06K 7/10722* (2013.01); *G06K 15/021* (2013.01);
(Continued)

(58) Field of Classification Search
CPC ............... G06F 3/03545; G06Q 30/02; H04N 1/32128
(Continued)

(56) References Cited

U.S. PATENT DOCUMENTS 5,517,234 A  5/1996 Gerber et al.
5,967,675 A  10/1999 Hastings et al.
(Continued)

FOREIGN PATENT DOCUMENTS

CN  102467691 A  5/2012
DE  4438278 A1  4/1995
(Continued)

*Primary Examiner* — Matthew C Bella
*Assistant Examiner* — Brian D Shin
(74) *Attorney, Agent, or Firm* — The Webb Law Firm

(57) ABSTRACT

A checking device for a label, with a processor for the detection of the label and a layout unit for the creation of a layout of the label from layout data, wherein the checking device comprises a data converter device configured in such a way that it generates test data from layout data in memory in order to control the processor. A data converter device for use in a checking device, wherein the data converter device is configured in such a way that it generates test data from layout data in memory for checking the label.

11 Claims, 2 Drawing Sheets

(52) U.S. Cl.
CPC ....... *G06K 15/024* (2013.01); *G06K 15/1885* (2013.01); *G06T 2207/30144* (2013.01); *G06T 2207/30168* (2013.01)

(58) Field of Classification Search
USPC .......................................... 382/218, 190, 187
See application file for complete search history.

(56) References Cited

U.S. PATENT DOCUMENTS

| | | | | |
|---|---|---|---|---|
| 6,463,426 | B1* | 10/2002 | Lipson et al. | ................ 382/181 |
| 7,265,662 | B2* | 9/2007 | Belanger | ...................... 340/521 |
| 2002/0044691 | A1* | 4/2002 | Matsugu | ...................... 382/218 |
| 2002/0087574 | A1 | 7/2002 | Walsh et al. | |
| 2003/0147097 | A1 | 8/2003 | Kotani et al. | |
| 2004/0066970 | A1 | 4/2004 | Matsugu | |
| 2005/0077354 | A1* | 4/2005 | Torchalski | ............. G06K 1/121 |
| | | | | 235/432 |
| 2006/0142889 | A1* | 6/2006 | Duggan | ............... G06Q 10/087 |
| | | | | 700/109 |
| 2007/0090190 | A1 | 4/2007 | Kuromatsu et al. | |
| 2009/0057415 | A1 | 3/2009 | Partanen et al. | |
| 2009/0173779 | A1* | 7/2009 | Szesko | ................ G06F 19/3462 |
| | | | | 235/375 |
| 2009/0263019 | A1* | 10/2009 | Tzadok | ................ G06K 9/6255 |
| | | | | 382/176 |
| 2011/0286669 | A1 | 11/2011 | Hagisawa et al. | |
| 2011/0303746 | A1* | 12/2011 | Learmonth | ........ G01N 21/3563 |
| | | | | 235/380 |

FOREIGN PATENT DOCUMENTS

| | | |
|---|---|---|
| GB | 2307547 A | 5/1997 |
| GB | 2411151 A | 8/2006 |
| JP | 200889379 A | 4/2008 |
| JP | 2011198036 A | 10/2011 |
| JP | 2011203886 A | 10/2011 |
| RU | 2414747 C2 | 4/2006 |
| WO | 2007049774 A1 | 5/2007 |
| WO | 2008093102 A2 | 8/2008 |

* cited by examiner

CHECKING DEVICE FOR A LABEL, WITH A DETECTION AND PROCESSING UNIT FOR THE DETECTION OF THE LABEL

CROSS-REFERENCE TO RELATED APPLICATIONS

This application is the United States national phase of International Application No. PCT/DE2013/100219 filed Jun. 18, 2013, and claims priority to German Patent Application No. 20 2012 102 237.0 filed Jun. 18, 2012, the disclosures of which are hereby incorporated in their entirety by reference.

BACKGROUND OF THE INVENTION

Field of the Invention

The invention relates to a checking device for a label, with a detection and processing unit for the detection of the label. Such checking devices include checking methods and checking systems and are used for example in the pharmaceutical industry, in the field of pharmaceutical manufacturing.

Description of Related Art

In the pharmaceutical industry, individual labels are affixed to the packs and/or the outer packaging of pharmaceutical products and then cross-checked for their correctness. In doing so relevant data such as the production batch, serial number, consignment number, expiration data, etc. are checked for plausibility in terms of content (e.g., permissible value ranges).

Also monitored, however, is the printing quality in terms of intensity, color, failure of printer nozzles/loss of pixels, etc., in order to ensure that the label will be read correctly in the application area (in drugstores, in hospitals, in patients' hands, in doctors' practices, etc.).

In the industrial production of pharmaceutical as well as other industrial products, a high processing speed prevails in the packaging line. A free recognition, processing, and analysis with conventional image processing systems (detection and processing unit), however, does not fulfill the requirements for the high processing speed desired because of the necessary time outlay. In the packaging industry on the other hand, the development and use of image processing systems that in theory operate essentially in real time is linked with excessively high costs.

Hence in the known checking systems currently employed, image processing systems are used in which the position of the label on a pack and the content fields (kinds and positions of the fields), e.g., test fields, description fields, serial number fields, etc., as well as their type, plain text, and graphics such as logos, 1D, 2D, or 3D codes such as barcodes (e.g., EAN), matrix codes (e.g., Aztec code, data matrix), point codes, and outward form must be input/taught in.

This means that a given label and its position on the pack as well as each single field in the label must be communicated to the software by the user, and manually adjusted and/or manually confirmed in terms of its properties. Afterwards all of the information for the check thus acquired (henceforth known as "test information") is stored and then used in application. Once taught-in, such test data can be called up for a current application, from databases for example.

A disadvantage resides in the fact that a manual readjustment (to the printer system and/or image processing system) is required, not only for new packs and/or new labels, but also for minimal changes to the printing, for example its position on the packaging, or to the packaging format.

SUMMARY OF THE INVENTION

Hence an object of the present invention is to create a checking method and a checking device which, in the production of labels on products, will enable a quick and cost-effective checking of the label, in which a quick and simple (initial) adjustment of the checking device is guaranteed in the event that the packaging and/or the label is altered.

According to the invention, for the adjustment or during the adjusting of the detection and processing unit at first use or in the event of an alteration of the packaging and/or the label, use is made of data already available for the creation of a label layout. The actual data used in printing the label on a product and/or on its packaging can be converted to test data (and optionally supplemented with additional data) and transferred to the detection and processing unit, in particular the image processor.

There these data are used as test data, thus making it possible to dispense with a time-consuming adjustment of the detection and processing unit, particularly in terms of the scanning positions (e.g., camera position) and in terms of the field positions and field types within a label. According to the invention, in particular the recording, comparison (with target values), and checking of an image are understood as detection and processing.

In a preferred embodiment of the invention, data already available in the layout system are used as test data for the detection and processing (device and method), especially image processing, before they are converted internally to a prepared complete layout (total print image) and printed as internal pixel graphics (e.g., bitmap) and before print nozzle control data, for example, are generated. Compared to a retrieval or conversion of print data in pixel graphic form to test data, which is also conceivable according to the invention, this can advantageously save even more time that would otherwise be dedicated to the aforementioned, rather significant conversion processes.

The data can be transferred in formats usable and understandable for modern print input/output, in the form of non-pixel defined metadata (e.g., metalanguage such as XML, etc.) from the layout system to the detection and processing unit, in particular the image processor. In a simple and expedient manner, test data can thus be generated semiautomatically (for example with manual confirmation) or even automatically in such a way that these data can be acquired and executed semiautomatically/automatically (in other words without manual reworking) by the image processing system as testing steps. Even with this application, a possible adjustment and/or conversion on the detection and processing unit is obviously conceivable in order to fulfill special requirements. This furthermore makes it possible to use a uniform and identical data source for the printer unit/system and the detection unit.

In particular the various idiosyncrasies of different detection and processing units, especially image processing systems, can be taken into account, wherein such special information can be downloadable from a specifications database in which individual information on different image processing systems can be stored.

Depending on the requirements of the detection and processing system and/or of the production line (in particular the packaging line), it is also conceivable to use the data obtained during the creation of a label layout (and at least available on or after completion of the layout), with additional data taken into account, as test data.

According to the invention, the use of layout data as test data is designated as data conversion, even when a processing of the test data in a preferred embodiment of the invention takes place upon (during or after) the creation of a layout. Then a data converter may be integrated in a layout process or system.

It is also conceivable, however, for the aforementioned data conversion to take place (externally) on the path between the layout unit and the detection and processing unit, or to be integrated in the detection and processing unit.

A data converter can be configured as a stand-alone unit or device (e.g., external PC with a conversion application running on it or a conversion achieved purely with switching circuitry, and also mixed forms such as hardware-supported conversion), or it can be integrated in the layout unit or detection and processing unit (integrated in the application and/or the hardware).

Advantageously, this makes it possible to use diverse data formats for the printing (print data) of a label (by means of a printing device) and/or as test data for detection and processing units/systems. A further (flexible) adaptation to new formats is achievable via a download, for example, to a conversion table, etc.

In another embodiment of the invention, additional test criteria available upon creation of a label layout can be used as (converted to) test data. For example, the products can be checked for "weight" (completeness checking with scales), "impurities" (e.g., by means of x-rays), correctly closed box (flap checking), etc., wherein the relevant criteria to be checked can also be transmitted automatically to the corresponding unit (image processor, weighing unit, x-ray unit, etc.) in the production line.

According to the invention, the position of the label on a product and/or a pack as well as the respective fields of the label can be automatically (by means of test data) located, recognized, identified, transformed and evaluated by means of OCR and/or OVR at the position specified (by means of test data). Parameters/statements or information known upon creation of a layout are used for this, in order to avoid time-consuming manual input and/or teach-in (identification and analysis) of new or altered conditions in the detection and processing unit.

According to the invention, a continuous automatic adjustment to labelling (e.g., serial number, time, date, graphics, artwork) unique for each pack is possible, without requiring any manual intervention (repeated teach-in of the system). Information can comprise any combination of formats/data such as the position, size and kind of labelling on the packaging (distance from edges, etc.) and also the positions and kinds of different fields within the label, in other words attributes of the fields such as field size, field position, field content/type, border, font, font size/scale, font styles (boldface, cursive, underline, etc.), font and background color, evaluation method (OCR—text back detection or OCV—gray value to target value comparison), number of digits, number range (plausibility checking with a permissible range of values), and artwork.

According to the invention, these formats/data can also be transmitted directly to the printer or converted to a (print) graphics file. The generation of test data, which can be assumed and executed automatically (without manual reworking) as test steps by the detection and processing unit, is effected by means of, for example, a so-called data converter, which has suitable programs for carrying out the data conversion. This data converter for the conversion of layout data to test data can be integrated in the print layout program or in the printer system, or it can convert the data externally (as an application executed on an external computer).

According to the invention, in this manner (conventional) print data formats (print layouts, especially in metalanguage/vector graphics) are automatically converted to a format that can be interpreted by detection and processing units (in particular optical systems) and which contains test data/test steps for the detection and processing unit (for example cameras, in particular intelligent smart cameras with web-based parameterization interfaces).

The labelling can be applied to the product or packaging in any manner. Examples of suitable devices for this include printers with different printing technology, in particular inkjet or laser technology. Obviously the use of other techniques to apply the labelling such as embossing (also for Braille labelling), scoring, etching, etc., is also conceivable.

In a preferred embodiment of the invention, the checking device comprises a print layout program with an integrated data converter and at least one printing system.

BRIEF DESCRIPTION OF THE DRAWINGS

The invention is explained in more detail in the following, with reference to an exemplary embodiment illustrated in the drawing.

Shown are.

DETAILED DESCRIPTION OF THE INVENTION

Figure 1:
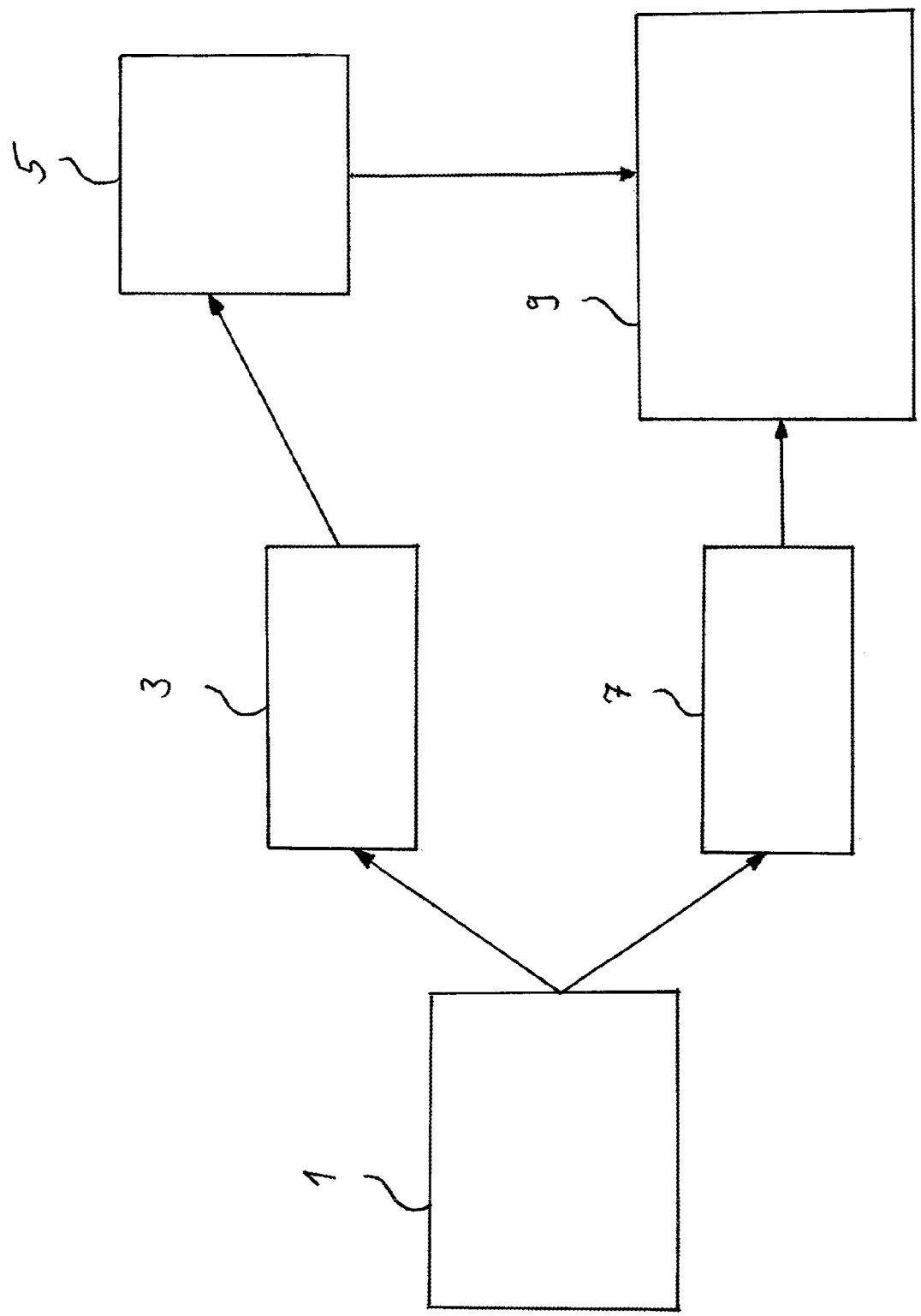
FIG. 1 a schematic block diagram of a checking device of the invention.

The checking device illustrated in FIG. 1 comprises a layout unit 1 for creating a layout of a label, which is transmitted as print data 3 to a printer, which prints the label on a product or a pack. Integrated in the layout unit 1 is a data converter, which converts data known upon layout creation into test data 7 and transmits it to an image processing system 9.

Figure 2:
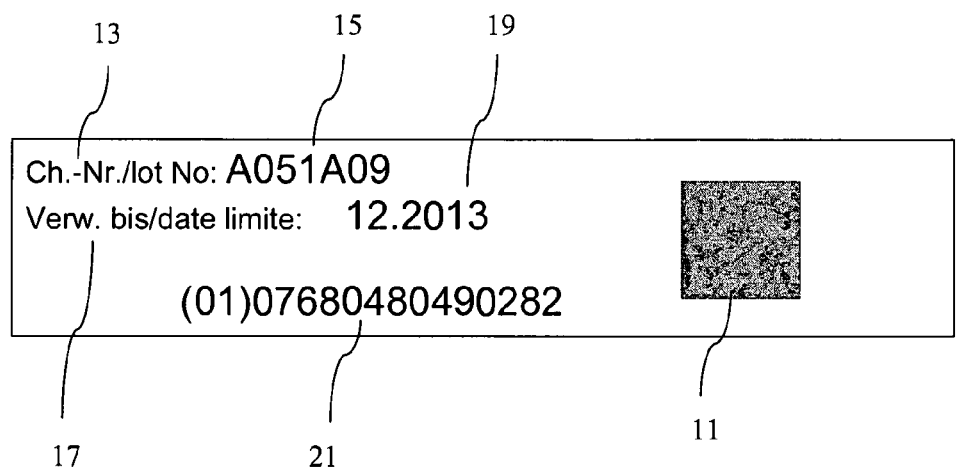
FIG. 2 a schematic illustration of a label.

Upon creation of the layout of the label illustrated in FIG. 2, fields differing in kind and position within a label are created and established. Thus a "batch number" field can be given a correspondingly readable field designation 13, whereas the field content 15 is located in the same line immediately to the right of this field designation 13.

Under the "batch number" on the top left is arranged an "expiration date" field with a field designation 17 and a field content 19 located in the same line immediately to the right thereof.

As can be discerned in FIG. 2, in the case of the "batch number" and "expiration date" fields plain text characters are used for the field designations 13, 17 (letters and symbols) and for the field content (numbers).

A serial number 21 arranged in the bottom center of the label can also be read directly and easily without decoding by consumers or users, for example.

On the other hand there is a coded field (henceforth designated as barcode 11) in the right-hand area of the label, which can only be read out with suitable decoding means (scanner with decoding software).

In addition, the position of the label on its future place of use can also be established in the layout unit 1.

These data, i.e., the position (and also the type and size) of the label on the product or packaging as well as the positions and kinds (plain text, coded, length of the field, font size, font style, etc.) of the fields 13, 15, 17, 19, 21, and 11 are input in a converter, which is preferably integrated as an application in the layout unit.

The converter transforms the aforementioned data/formats into test data 7, according to which test steps of the image processing system are executed or the execution thereof is controlled.

Because the test data are automatically created and available in the image processing system, a time-consuming adjustment and/or teach-in of the image processing system can thus be avoided.

In contrast to conventional systems, which only create test data for rapid processing by means of manual input and/or teach-in, with the system and method of the invention any change in labelling and/or product/packaging (type, geometry, material, spatial position) can be taken into account faster (automatically). A repeated (manual) teach-in of the image processing system is dispensed with.

The use of histogram methods and difference images without teach-in, however, is not sufficient for the rapid printing on products or packs desired in a production line. In contrast, the invention enables the necessary individual checking of the print areas and a precise positioning as well as repositioning of individual test areas.

The system and the method of the invention are not limited to the exemplary embodiment described here. Their applicability relates to all applications in which the labelling of a product or packaging and the checking thereof for correct readability is required. As part of the quality assurance that is now standard practice for product labelling as well, the use of the invention for the labelling of everything from specialty products (medical technology, military products, etc.) to everyday products (food packaging) is conceivable.

Regardless of the case of application of the invention, the advantages described in the following are also achievable.

By making current new test data and print data available, a common automatic switch-over of the printer system and the camera system/detection unit can be effected by the system of the invention. The downtimes that would otherwise be necessary for a readjustment are thus eliminated.

The creation of test data by means of a (data) converter renders an adaptation to different detection systems and printer systems easy. Corresponding individual specification data of a detection system or printer system can be manually input or called up from a database for this. In an advantageous manner, an independence from the target system (printer and detection system) is made possible by the invention. In particular, fonts used in the creation of the label layout according to the invention can be made available to the detection and processing unit in a simple and expedient manner.

Because preferably all of the test data and settings of the detection system are automatically calculated from the layout/print data and automatically transmitted to the image processing system, a detection system (in particular an image processing system) is initialized and the entire device (for printing and detecting and processing, e.g., track & trace) is ready to operate only a short while after the print layout creation is complete.

With the system and method of the invention, advantageously test criteria such as:
Code reading
Printing corresponds to defaults?
Compare vectorized printer defaults to the printed image
Check nozzle-outs (detect inkjet clogs, for example)
Missing print areas (detect incorrect field positions, for example)
Check for empty spaces (for example additional print, larger "satellites" (spatters), smears, etc.)
can easily be fulfilled.

The system and method of the invention thus enables maximum detection quality with minimal effort for setting up the detection and processing unit and/or the printer system. Owing to the automation and elimination of manual and in some cases repeated input of production data, the likelihood of errors can also be reduced. Plus material wear is minimized. Rather than separate data storage, the invention advantageously enables central data storage in only one layout.

LIST OF REFERENCE SIGNS

1 Layout unit with integrated data converter
3 Print data
5 Printer
7 Test data
9 Image processing system
11 Barcode
13 "Batch" field designation
15 Field content of 13
17 "Expiration date" field designation
19 Field content of 17
21 Serial number

The invention claimed is:

1. A checking system for recognizing, identifying, transforming, and evaluating, using test data, a label, comprising a processor for the detection of the label and a layout processor for the creation of a layout of the label from layout data, wherein:
the checking system also comprises a data converter processor, which is configured in such a way that it generates test data from layout data in memory in order to control the detection processor to detect a label based on new test data, wherein the new test data is generated by converting the layout data, or alternatively, control data, for controlling a printer while avoiding processing of a printed image,
wherein the test data includes position, size or kind of at least one of the label or fields of the label, and
wherein the detection processor automatically detects a position, size, or kind of a label at a corresponding position on a product or packaging as specified by the test data.

2. The checking system according to claim 1, wherein the processor is configured as an image processor.

3. The checking system according to claim 1, wherein the test data exist as metadata.

4. The checking system of claim 1, wherein the data converter device comprises one of a stand-alone unit, a switched circuit, or an integrated circuit.

5. The checking system according to claim 1, wherein the detection processor automatically detects at least one of the position, size, or kind of a respective field of the label on the product or packaging at the position specified by the test data.

6. A data converter device, comprising:

a processor that receives data known upon a layout creation of a label from a checking device;

a processor executing a data converter application for transforming said data into test data from layout data in memory to detect a label based on new test data, wherein new test data is generated by converting the data, or alternatively, control data, for controlling a printer while avoiding processing of a printed image; and a processor for transmitting said converted data to an image detection processor, wherein the test data includes position, size, or kind of at least one of the label or fields of the label, and wherein the image detection processor automatically detects a position, size, or kind of a label at a corresponding position on a product or packaging as specified by the test data.

7. The data converter device of claim 6, wherein the data converter device comprises one of a stand-alone unit, a switched circuit, or an integrated circuit.

8. The data converter device of claim 6, wherein the detection processor automatically detects at least one of the position, size, or kind of a respective field of the label on the product or packaging at the position specified by the test data.

9. The data converter device of claim 6, wherein the data converter device is configured in such a way that the test data are transmitted in metadata form.

10. A method for checking a label, comprising the steps of:

using layout data for the creation of the label;

configuring a data converter device to generate test data using layout data in memory;

transforming layout data in memory into test data to detect a label based on new test data wherein the new test data is generated by converting the layout data into the new test data, or alternatively, control data, for controlling a printer while avoiding processing of a printed image; and detecting the label using the test data to control a processor to check the label, wherein the test data includes position, size, or kind of at least one of the label or fields of the label, and wherein the processor automatically checks a label by detecting a position, size, or kind of a label at a corresponding position on a product or packaging as specified by the test data.

11. A method for checking a label of claim 10, wherein the detection processor automatically detects at least one of the position, size, or kind of a respective field of the label on the product or packaging at the position specified by the test data.

* * * * *